US007107600B2

(12) United States Patent
Reasoner et al.

(10) Patent No.: US 7,107,600 B2
(45) Date of Patent: Sep. 12, 2006

(54) SYSTEM AND METHOD FOR CLEANING ELECTRICAL DELIVERY SYSTEMS

(75) Inventors: Kelly John Reasoner, Fort Collins, CO (US); Gregg S. Schmidtke, Fort Collins, CO (US); Conrad K. Meyer, Ault, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 399 days.

(21) Appl. No.: 10/389,573

(22) Filed: Mar. 17, 2003

(65) Prior Publication Data

US 2004/0182421 A1 Sep. 23, 2004

(51) Int. Cl.
*G11B 17/22* (2006.01)

(52) U.S. Cl. ........................................ 720/648; 360/92

(58) Field of Classification Search ................ 720/648; 360/92; 15/88, 88.1; 134/15, 32
See application file for complete search history.

(56) References Cited

U.S. PATENT DOCUMENTS 1,808,555 A * 6/1931 Ishimaru ..................... 200/253
2,000,909 A * 5/1935 Alsaker ....................... 29/863
3,632,001 A * 1/1972 Richens et al. ............. 414/661
4,216,846 A 8/1980 Wheeler
4,523,865 A 6/1985 Schacht
4,570,285 A 2/1986 Skelton
4,647,140 A * 3/1987 Crawford .................... 439/629
5,070,569 A 12/1991 Wilkins
5,181,292 A * 1/1993 Aghachi .................. 15/236.08
5,386,882 A 2/1995 Friend
5,473,414 A * 12/1995 Thompson .................. 399/354
5,688,231 A * 11/1997 Flower ........................ 604/20
5,771,144 A * 6/1998 Kim ........................... 360/137
6,119,299 A 9/2000 Lin
6,510,020 B1 * 1/2003 Holmquist et al. ........... 360/92
6,741,182 B1 * 5/2004 Smith et al. ................ 340/664
6,813,804 B1 * 11/2004 Kim et al. ................. 15/306.1

FOREIGN PATENT DOCUMENTS

EP 982724 A2 * 3/2000
GB 2256753 A * 12/1992
JP 63144426 A * 6/1988

* cited by examiner

*Primary Examiner*—William J Klimowicz

(57) ABSTRACT

System and method for cleaning an electrical delivery system. An embodiment of the self-cleaning electrical delivery system comprises a track having an abrasive surface and a brush operatively associated with the track, the brush moving over the abrasive surface of the track to remove debris from the brush. A tool for producing the abrasive surface is also disclosed.

20 Claims, 6 Drawing Sheets

SYSTEM AND METHOD FOR CLEANING ELECTRICAL DELIVERY SYSTEMS

FIELD OF THE INVENTION

The invention generally pertains to electrical delivery systems, and more specifically, to system and method for cleaning electrical delivery systems.

BACKGROUND

Electrical delivery systems are commonly used for transferring electrical power and/or electrical signals between moving components, such as for use with the moving components of an electric motor. Such electrical delivery systems eliminate the need for electrical cabling between the moving parts, which may become tangled or wrapped around one or more of the moving components during operation.

Typical electrical delivery systems comprise a brush provided in electrical contact with a track, but the brush and track are not hard-wired together. Accordingly, the brush and track remain in electrical contact with one another even when moved relative to one another. In use, the brush may be mounted to a first component, and the track may be mounted to a second component, enabling electrical power and/or electrical signals to be transferred between the first and second components even when they are moving.

Over time, however, corrosion or other debris may collect on the brush and/or track. For example, cupric and cuprous oxides tend to form on brush and track systems manufactured from copper-based materials. Other debris (e.g., airborne particulates) may also accumulate on the brush and/or track. Accumulation of debris on the brush and/or track acts as an electrical insulator, which may interfere with power and/or signal delivery.

The brush and/or track in these electrical delivery systems may be cleaned periodically, for example, using any of a variety of commercially-available cleaning solutions. However, the use of cleaning solutions introduces a host of other issues. By way of example, some cleaning solutions interact with the brush and/or track to produce further corrosion, or even react to dissolve the brush and/or track. Liquid cleaning solutions are often messy. Chemical-based cleaning solutions introduce potential environmental/disposal problems, and in some circumstances may pose a health risk if not properly used. In addition, the electrical delivery system and associated devices must be taken out of service for cleaning.

SUMMARY OF THE INVENTION

One embodiment involves a self-cleaning electrical delivery system comprising a track having an abrasive surface and a brush operatively associated with the track, the brush moving over the abrasive surface of the track to remove debris from the brush.

A method for cleaning an electrical delivery system, according to one embodiment of the invention, comprises contacting a brush of the electrical delivery system with a track of the electrical delivery system, moving the brush over an abrasive surface provided on the track of the electrical delivery system, and removing debris from the brush as the brush moves over the abrasive surface.

A tool for producing an abrasive surface on a track of an electrical delivery system is also disclosed. One embodiment of the tool comprises a blade, a positioning block operatively associated with the blade, and a handle operatively associated with the blade. The positioning block locates the blade over the track of the electrical delivery system. The handle moves the blade across the track to produce the abrasive surface on the track of the electrical delivery system.

BRIEF DESCRIPTION OF THE DRAWINGS

Illustrative embodiments of the invention are shown in the drawings, in which:

FIG. 6(*b*) is a top view of a portion of track of the electrical delivery system, showing yet another embodiment of an abrasive surface;

FIG. 7(*b*) is another side view of the tool shown in FIG. 7(*a*), wherein the blade is in an extended position.

DETAILED DESCRIPTION

Figure 1:
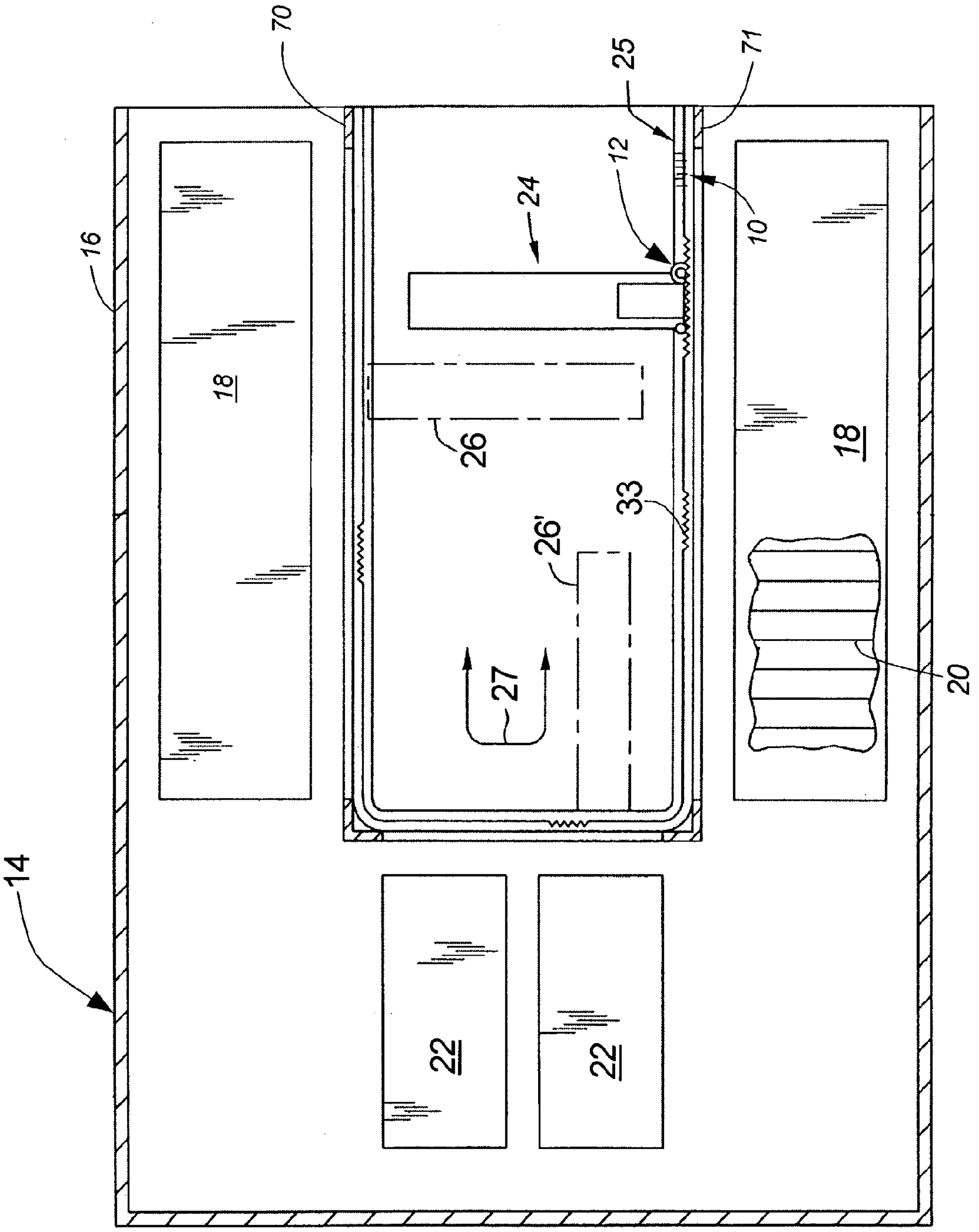
FIG. 1 is a plan view of one embodiment of a media storage system with which the cleaning system of the present invention may be used.

Cleaning system 10 (FIG. 1) for an electrical delivery system 12 is shown and described herein according to embodiments of the invention. In one embodiment, the cleaning system 10 may be used with a media storage system 14, such as the one shown in FIG. 1. Of course it is understood that the invention is not limited to use with the electrical delivery system 12 of media storage system 14, and may be used in conjunction with any of a wide range of other types and configurations of electrical delivery systems.

Briefly, the media storage system 14 may comprise at least one storage library 16. Storage library 16 may comprise a number of storage magazines 18 for storing storage media 20, such as, magnetic disk or tape, optical media, or the like. Storage library 16 may also comprise one or more read/write devices 22 capable of reading and/or writing data on the storage media 20.

A cartridge-engaging device 24 is mounted to guide rail 25 in the storage library 16, and can be moved in the directions of arrow 27 along guide rail 25 between the storage magazines 18 and the read/write device 22. The cartridge-engaging assembly 24 is adapted to access (i.e., retrieve and eject) a data cartridge 20 and to transport it between the storage magazines 18 and the read/write device 22 in the media storage system 12.

By way of example, the cartridge-engaging device 24 is shown in FIG. 1 adjacent the storage magazines 18 at position 26 where it may access the storage media 20 from storage magazine 18. The cartridge-engaging device is shown in FIG. 1 adjacent the read/write device 22 at position 26' where it may deliver the storage media for read and/or write operations.

Figure 2:
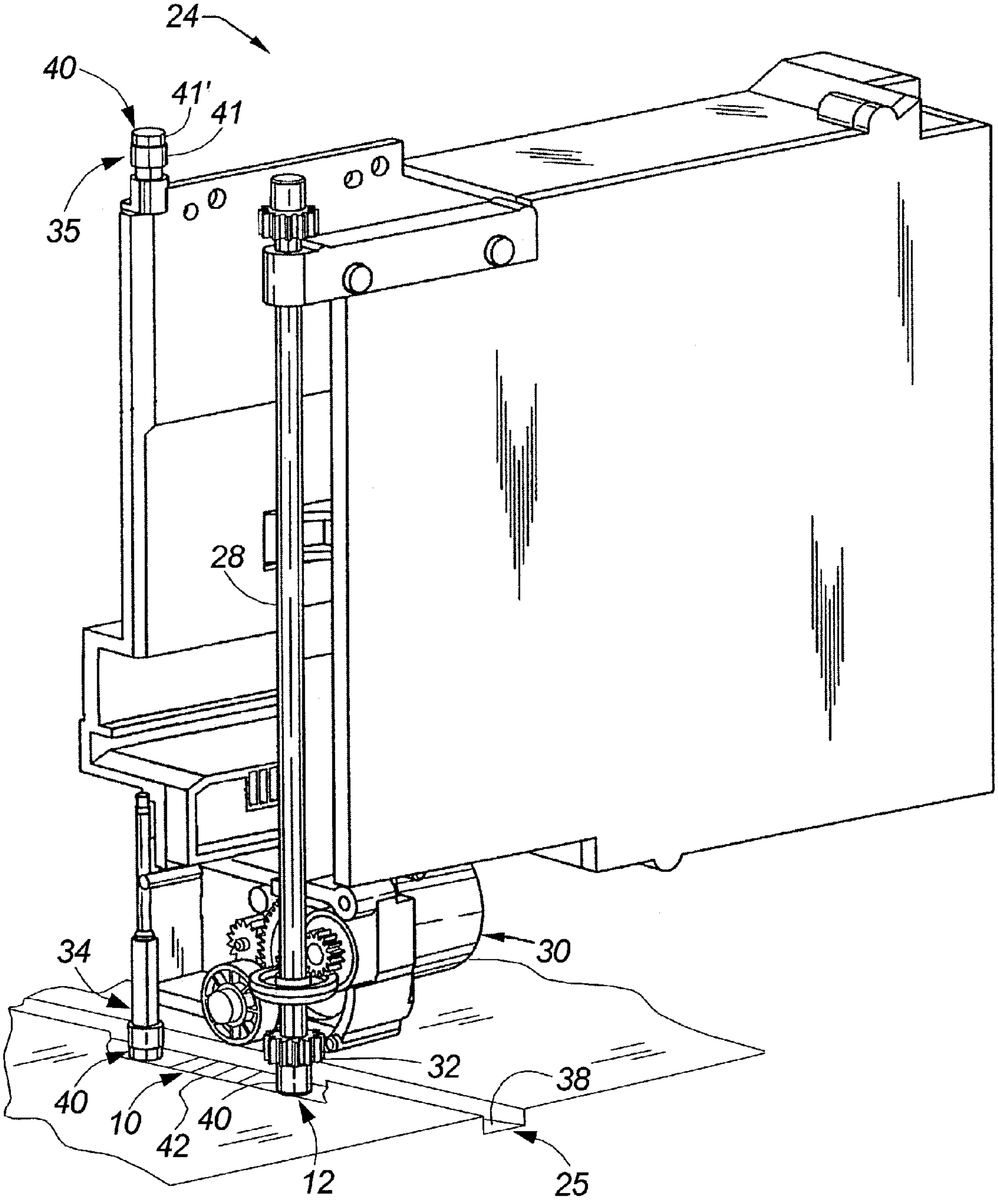
FIG. 2 is a perspective view of a cartridge-engaging device for use in the media storage system of FIG. 1, showing an embodiment of the electrical delivery system in more detail.

One embodiment of the cartridge-engaging device 24 is shown in more detail in FIG. 2 mounted on the floor of storage library 16. Cartridge-engaging device 24 may comprise a drive shaft 28 and guide shaft 34 received in guide rail 25 on the floor of storage library 16. Although not shown, it is noted that the drive shaft 28 and guide shaft 35 may be similarly mounted to a guide rail provided on the ceiling of storage library 16.

Cartridge-engaging device 24 may comprise a drive assembly 30 (e.g., an electric motor with associated gears) operatively associated with the drive shaft 28. Drive gear 32 engages gear rack 33 (see FIG. 1; not shown in FIG. 2 for purposes of clarity). Accordingly, drive assembly 30 may be operated to effect rotational movement of drive shaft 28, and in turn, translational movement of the cartridge-engaging device 24 along guide rail 25.

An electrical delivery system 12 is provided for transferring electrical power and/or electrical signals between the cartridge-engaging device 24 and various ancillary devices of the media storage system 14.

In one embodiment, electrical delivery system 12 comprises a brush and track system, shown in more detail in FIG. 2. The floor of storage library 16 has been cut-away in FIG. 2 to show a track 38 and a brush 40. In this embodiment, the track 38 is provided adjacent the guide rail 25 in storage library 16. The brush 40 may comprise a brass barrel 41 and with a carbon and copper insert 41'. The brush 40 is preferably provided on either or both guide shafts 34, 35 on cartridge-engaging device 24.

Of course, in other embodiments the electrical delivery system 12 may comprise brushes 40 on either or both ends of the drive shaft 28. In addition, electrical delivery system 12 may comprise tracks 38 on one or more guide rails 25 (e.g., on the floor and/or ceiling of storage library 16).

In any event, a hard-wired connection may be provided from the various components in the storage library 16 to the track 38, and another hard-wired connection may be provided from the brush 40 to the various components on the cartridge-engaging device 24. Brush 40 contacts track 38, forming an electrically conductive path between the brush 40 and track 38. Accordingly, electrical power and/or electrical signals may be transferred between the brush 40 and track 38 even when the cartridge-engaging device 24 is moving in the storage library 16.

Figure 3:
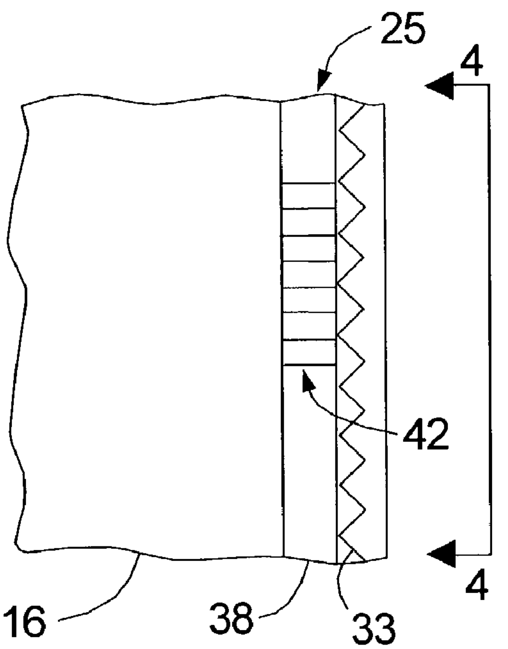
FIG. 3 is a top view of a portion of track of the electrical delivery system, showing one embodiment of an abrasive surface for the cleaning system.
Figure 4:
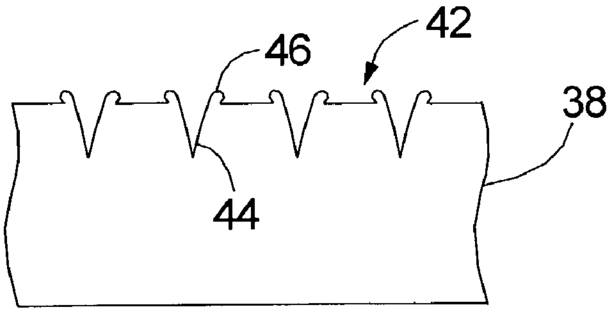
FIG. 4 is a side view of the track taken along line 4—4 from FIG. 3, showing a profile of abrasive surface according to one embodiment.

Cleaning system 10 may comprise an abrasive surface 42 provided on the surface of track 38, as better seen in the top and side views of track 38 shown in FIG. 3 and FIG. 4, respectively. As the cartridge-engaging device 24 moves along the guide rail 25, brush 40 moves over the abrasive surface 42 on track 38. The interaction between the brush 40 and abrasive surface 42 causes corrosion or other debris on brush 40 to loosen and dislodge from the brush 40, thereby performing a self-cleaning function during operation of the cartridge-engaging device 24.

According to one embodiment of the invention, abrasive surface 42 comprises one or more channels 44 formed in the track 38 and one or more ridges 46 formed from or otherwise provided on the track 38, as shown in more detail in the profile view of FIG. 4. For example, a plurality of channels 44 may be formed on the track 38 by scratching the track 38 with a hard object, such as the blade of a screwdriver. Ridges 46 may be formed as burrs when the channels 44 are formed on the track 38. Preferably, the ridges 46 are partially flattened to remove the jagged edges, as shown in FIG. 4. Flattening the ridges 46 reduces the likelihood that they will cause damage to the brush 40 when the brush 40 moves over abrasive surface 42.

Abrasive surface 42 may comprise any suitable number of channels 44 and ridges 46. The number of channels 44 and ridges 46 depends on various design considerations, such as, but not limited to the rate at which debris accumulates on the brush 40 and the number of abrasive surfaces 42 provided on the track 38.

Figure 5:
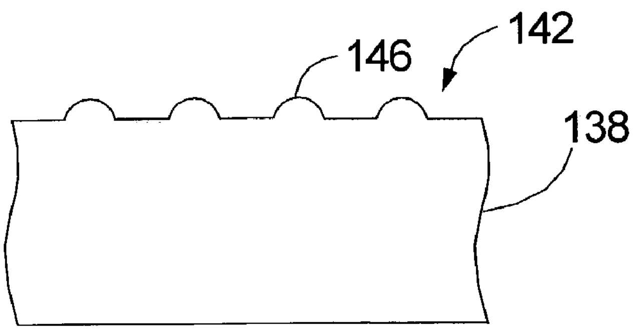
FIG. 5 is a side view of track showing a profile of abrasive surface according to another embodiment.

Of course it is understood that the invention is not limited to the embodiment just described. In another embodiment, abrasive surface 42 may comprise only channels 44 and no ridges 46. For example, ridges 46 may not be formed at all or may be removed by filing. In yet another embodiment, abrasive surface 42 may comprise ridges 46, but no channels 44 formed in the track 38. For example, ridges may comprise beads 146 provided on the track 138 the embodiment shown in FIG. 5.

Channels 44 and ridges 46 provided on the track 38 may have any suitable profile. For example, the channels 44 have a substantially V-shaped profile and the ridges 46 have a rounded profile, as shown in FIG. 4. However, in other embodiments, the channels 44 may be more U-shaped and the ridges 46 may be "pointed". Of course these embodiments are merely exemplary and yet further embodiments are also contemplated as being within the scope of the present invention.

Preferably, abrasive surface 42 comprises a substantially linear pattern, wherein the channels 44 are substantially parallel to one another and are substantially perpendicular to the direction of travel of brush 40 over the track 38, as shown in FIG. 3 and FIG. 4. However, the invention is not limited to any particular pattern. In another embodiment, abrasive surface 242 may comprise a crossed pattern, as shown in FIG. 6(*a*) (which further depicts track 238, guide rail 225, and gear rack 233 in storage library 216).

Figure 6A:
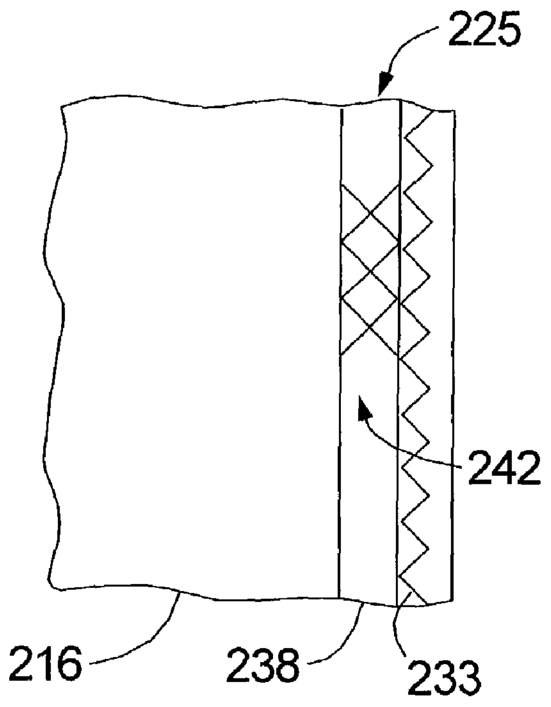
FIG. 6(*a*) is a top view of a portion of track of the electrical delivery system, showing another embodiment of an abrasive surface.
Figure 6B:
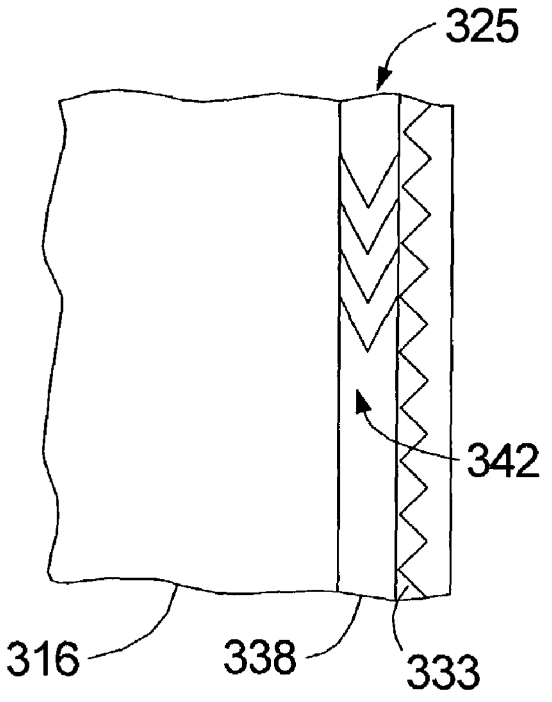

In another embodiment, abrasive surface 342 may comprise a substantially V-shaped pattern, as shown in FIG. 6(*b*) (which further depicts track 338, guide rail 325, and gear rack 333 in storage library 316). This pattern facilitates removal of debris from the abrasive surface 342 during operation. That is, as debris is removed from the brush 40, the debris accumulates in the abrasive surface 342. Debris that continues to be removed, in turn, forces the previously accumulated debris outward from the center of abrasive surface 342, much like the tracks on a tractor tire serve to remove mud from the tire. The debris can then be readily removed, for example, by sweeping or vacuuming it from the storage library 14.

In any event, abrasive surface 42 may be located in any suitable position along the length of track. In one embodiment, abrasive surface 42 may be provided at one of the ends 70, 71 of the guide rail 25 (see FIG. 1). Abrasive surface 42 may even be located in a designated "cleaning area" (not specifically shown), wherein the cartridge-engaging device 24 is moved to the designated cleaning area only for cleaning operations. According to such embodiments, brush 40 does not come into contact with the abrasive surface 42 as frequently during operation, which increases the operational life of the brush 40. Such embodiments may be particularly advantageous when debris is slower to accumulate on the brush 40.

Of course the invention is not limited to these embodiments, and abrasive surface 42 may be located at any suitable position along the track 38. For example, abrasive surface 42 may be provided adjacent the read/write device 22, so that the brush 40 routinely comes into contact with the abrasive surface 42 during operations (e.g., each time the read/write device 22 is accessed). Such an embodiment may be particularly advantageous when debris accumulates quickly on the brush 40.

It should also be noted that cleaning system 10 of the present invention is not limited to only one abrasive surface 42 on track 38. In other embodiments, a plurality of abrasive surfaces 42 may be provided along the track 38. Indeed, the entire length of track 38 may be provided with abrasive surface 42.

As discussed above, the configuration of abrasive surface 42 may be modified according to various design considerations to enhance performance of the cleaning system 10.

We depart briefly from our description of the cleaning system 10 to describe a means for producing the abrasive surface 42. First, it should be noted that the abrasive surface 42 may be provided on track 38 using any suitable means. For example, track 38 may be cast or otherwise manufactured with abrasive surface 42. Alternatively, abrasive surface 42 may be provided by scratching the surface of track 38 using a hard object such as the blade of a screwdriver. In another embodiment, however, abrasive surface 42 may be provided using a tool, such as the tool 50 shown in FIG. 7(*a*) and FIG. 7(*b*).

Tool 50 comprises a blade 52 operatively associated with a handle 54 and a positioning block 56. One embodiment of blade 52 is shown in more detail in FIG. 8. Blade 52 may comprise teeth 62 for forming the channels 42 on the track 38. Although blade 52 may be manufactured from any suitable material, in preferred embodiments, teeth 62 are made of a reinforced material (e.g., carbon coating) for durability and ease of use.

Optionally, blade 52 may comprise arcs 64 for flattening the jagged edges of any burrs (e.g., ridges 46 in FIG. 4) that might be formed by the teeth 62. When the blade 52 passes over the ridges 46, arcs 64 flatten or "roll" the ridges 46.

Figure 8:
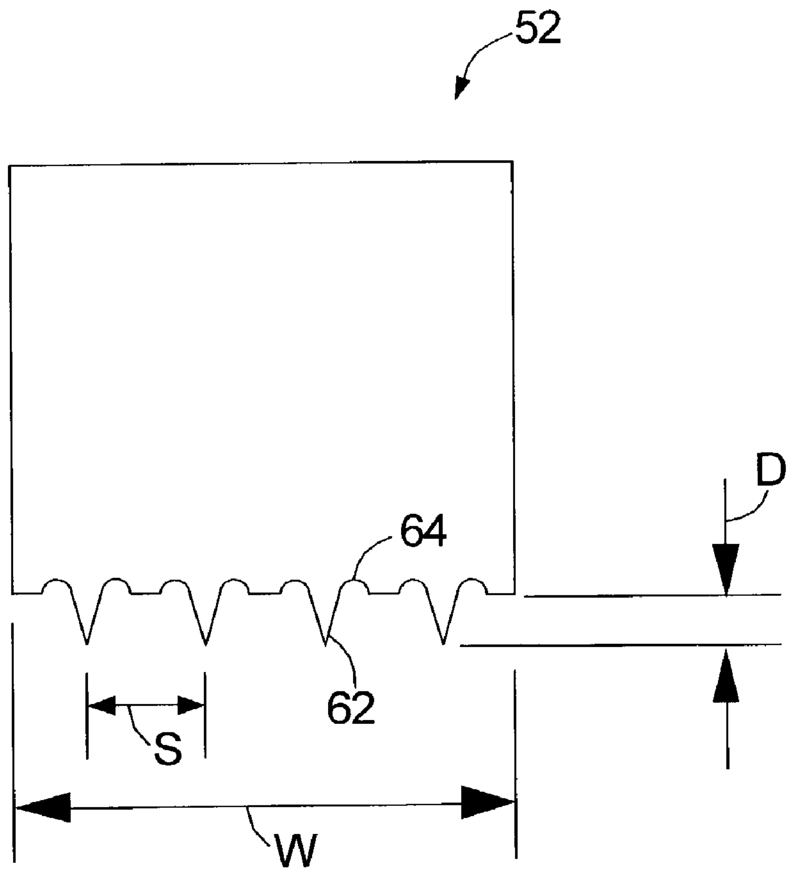
FIG. 8 is a front view of one embodiment of the blade for the tool shown in FIG. 7(*a*) and FIG. 7(*b*).

Of course the blade 52 shown in FIG. 8 is merely exemplary of one embodiment. Blade 52 may be modified according to various design considerations to produce different profiles for abrasive surface 42. Design considerations may include, for example, the depth D of the teeth 62, the spacing S of the teeth 62 from one another, and the overall width W of the blade 52, to name only a few. Likewise, blade 52 may be oriented in positioning block 56 in any suitable manner to produce the desired pattern for abrasive surface 42.

Figure 7A:
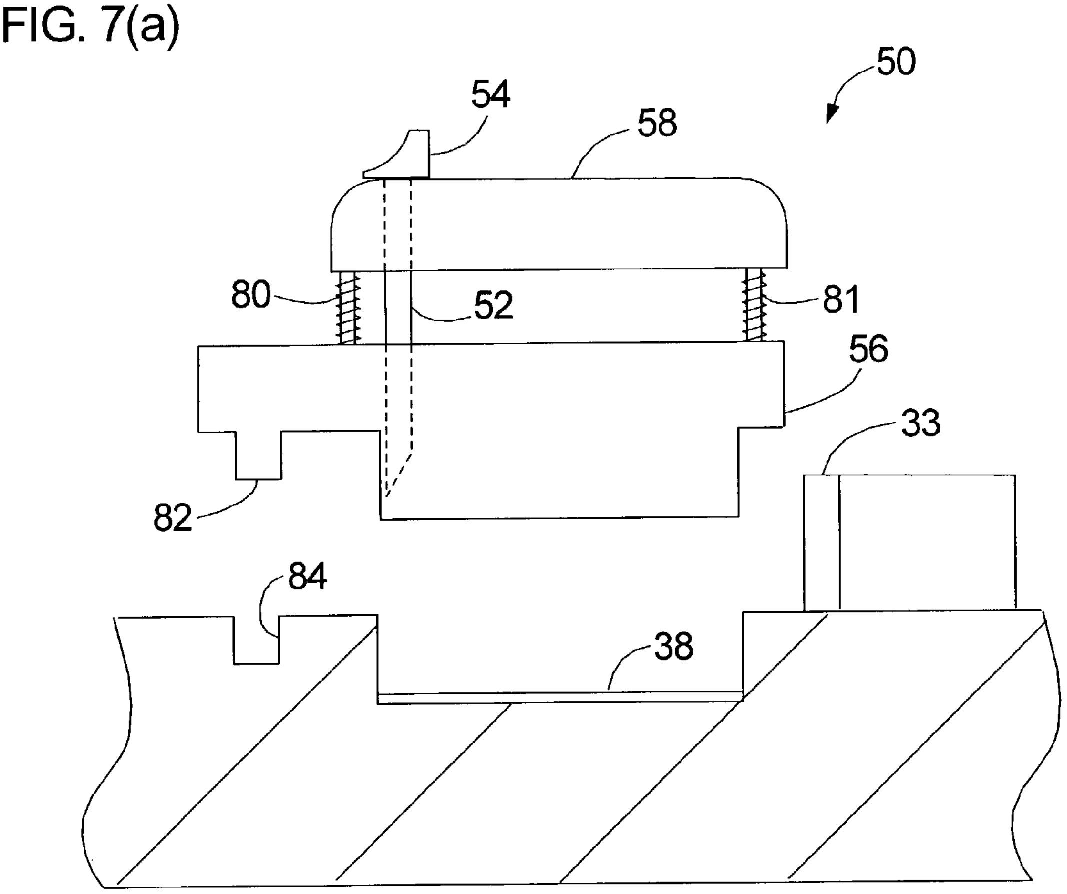
FIG. 7(*a*) is a side view of one embodiment of a tool for providing abrasive surface on a track of electrical delivery system, wherein the blade is in a retracted position.
Figure 7B:
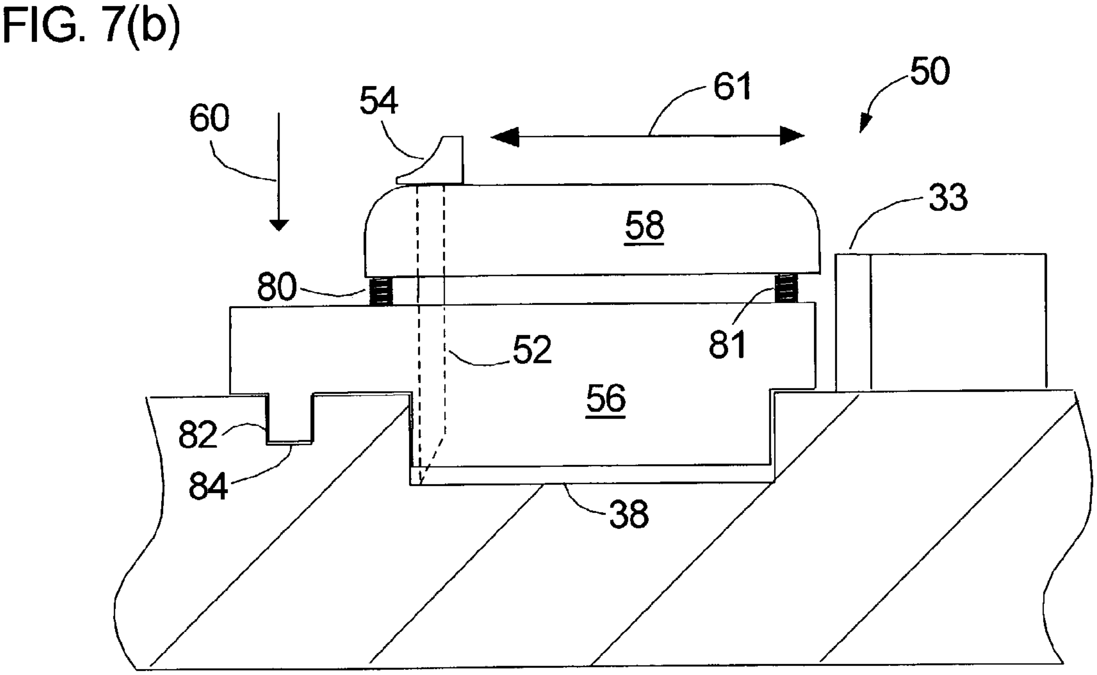

The blade 52 is preferably retractable, for example, by plunge assembly 58 resiliently attached to the positioning block 56. Accordingly, blade 52 can be recessed within positioning block 56 of the tool 50 when it is not in use, as shown in FIG. 7(*a*). Applying a force on plunge assembly 48 against the springs 80, 81 causes the blade 52 to move out from within positioning block 56 and come into contact with the track 38, as shown in FIG. 7(*b*).

In one embodiment, the positioning block 56 may be used to align the blade 52 of tool 50 with the track 38. For example, positioning block 56 may fit within the guide rail 25, which serves to align the blade 52 over the track 38.

Optionally, tool 50 may comprise a key for aligning the tool 50 on the portion of track 38 where the abrasive surface 42 should be produced. For example, the key may comprise a pin 82 on tool 50 which corresponds to a mating slot 84 on or near the track 38. In use, the tool 50 is located on the track 38 so that the pin 82 fits into mating slot 84 at a predetermined position.

As a brief description of its operation, tool 50 may be used to produce abrasive surface 42 according to one embodiment as follows. Positioning block 56 of tool 50 is located over the track 38, as shown in FIG. 7(*a*). The user applies a force (e.g., in the direction of arrow 60) to the plunge assembly 58, causing the blade to engage the track 38 as shown in FIG. 7(*b*). While applying force to the plunge assembly 58, the user may slide the handle 54 in the directions of arrow 61 so that the blade 52 moves across track 38 and produces abrasive surface 42 on the track 38.

Of course it is understood that tool 50 may be manufactured using any suitable materials. In addition, tool 50 may be configured according to various design considerations for use with different types of electrical delivery systems 12 and/or to enhance the performance of cleaning system 10.

Returning again to our discussion of embodiments of the cleaning system 10, we note that cleaning system 10 is not limited to use with electrical delivery systems 12 for media storage systems 14. Cleaning system 10 of the present invention may be used to clean the brush 40 of other electrical delivery systems 12 that are used to transfer electrical power and/or electrical signals between other moving components. For example, cleaning system 10 may be used with the brush and axle of an electric turbine or motor.

In operation, cleaning system 10 is used to remove debris (e.g., corrosion) from the brush 40 of electrical delivery system 12. According to one embodiment, cleaning system 10 contacts the brush 40 with track 38 of the electrical delivery system 12, and moving the brush 40 over abrasive surface 42 provided on the track 38. For example, the brush 40 on drive shaft 28 of cartridge-engaging device 24 is preferably configured to fit within guide rail 25 of media storage system 14 so that the brush 40 contacts track 38, as described above. When cartridge-engaging device 24 is operated to move on guide rail 25 in the media storage system 14, brush 40 contacts abrasive surface 42. The interaction between the brush 40 and abrasive surface 42 causes debris to loosen and be removed from the brush 40.

During operation, abrasive surface 42 may also dislodge a portion of the brush 40 itself. The dislodged portion of brush 40 may remain between the brush 40 and the track 38, serving as a scrubbing agent for the track 38. That is, as the brush 40 is moved to other areas of the track 38, the dislodged portion of brush 40 may serve to clean the track 38.

What is claimed is:

1. A method for cleaning an electrical delivery system in a media storage system, comprising:

contacting a brush of the electrical delivery system with a track of the electrical delivery system, the brush being part of a cartridge-engaging device movable along the track;

moving the brush over an abrasive surface provided on the track of the electrical delivery system;

removing debris from the brush as the brush moves over the abrasive surface.

2. The method of claim 1, further comprising providing the abrasive surface by forming at least one ridge on the track.

3. The method of claim 1, further comprising dislodging a portion of the brush with the abrasive surface, and moving the dislodged portion of the brush along the track to clean the track.

4. The method of claim 1, further comprising moving the cartridge-engaging device to a storage magazine to withdraw storage media from the storage magazine.

5. A method for cleaning an electrical delivery system, comprising:

contacting a brush of the electrical delivery system with a track of the electrical delivery system;

moving the brush over an abrasive surface provided on the track of the electrical delivery system;

removing debris from the brush as the brush moves over the abrasive surface; and providing the abrasive surface by forming at least one channel in the track.

6. The method of claim 5, wherein providing the abrasive surface further comprises providing at least another channel in the track, the channels being substantially perpendicular to a direction of travel of the brush.

7. The method of claim 6, wherein providing the abrasive surface further comprises forming ridges along with the channels.

8. A media storage system, comprising:

a cartridge-engaging device; and self-cleaning electrical delivery system, comprising:

a track having an abrasive surface, the cartridge-engaging device movable along the track; and a brush that is part of the cartridge-engaging assembly and that is operatively associated with said track, said brush moving over said abrasive surface of the track to remove debris from the brush.

9. The media storage system of claim 8, wherein said abrasive surface comprises at least one ridge.

10. The media storage system of claim 9, wherein said at least one ridge has a rounded profile.

11. The media storage system of claim 8, wherein said abrasive surface has a pattern of channels oriented substantially perpendicular to a direction of travel of said brush along said track.

12. The media storage system of claim 8, wherein said abrasive surface has a crossed pattern.

13. The media storage system of claim 8, wherein said abrasive surface has a substantially V-shaped pattern.

14. A self-cleaning electrical delivery system, comprising:

a track having an abrasive surface; and a brush operatively associated with said track, said brush moving over said abrasive surface of the track to remove debris from the brush, wherein said abrasive surface comprises at least one channel.

15. The self-cleaning electrical delivery system of claim 14, wherein said at least one channel has a substantially V-shaped profile.

16. The self-cleaning electrical delivery system of claim 14, wherein the abrasive surface has at least another channel, the channels being substantially perpendicular to a direction of travel of the brush.

17. A self-cleaning electrical delivery system for a media storage system, comprising:

an abrasive surface formed on a track in the media storage system;

a brush provided on a cartridge-engaging device, said brush in electrical contact with said track, said brush moving over said abrasive surface of said track when said cartridge-engaging device is moved, wherein an interaction between said brush and said abrasive surface loosens debris from said brush.

18. The self-cleaning electrical delivery system of claim 17, further comprising a cleaning area, said abrasive surface located in said cleaning area.

19. The self-cleaning electrical delivery system of claim 18, wherein said cleaning area is at an end of a guide rail of the media storage system.

20. The self-cleaning electrical delivery system of claim 18, wherein said cleaning area is adjacent a read/write device of the media storage system.

* * * * *

UNITED STATES PATENT AND TRADEMARK OFFICE

CERTIFICATE OF CORRECTION

PATENT NO. : 7,107,600 B2
APPLICATION NO. : 10/389573
DATED : September 12, 2006
INVENTOR(S) : Kelly John Reasoner et al.

It is certified that error appears in the above-identified patent and that said Letters Patent is hereby corrected as shown below:

On the Title page, in field (73), in “Assignee”, in column 1, line 2, delete “LP.,” and insert -- L.P., --, therefor.

Signed and Sealed this

Sixth Day of October, 2009

David J. Kappos

David J. Kappos
*Director of the United States Patent and Trademark Office*